US008990005B2

(12) United States Patent
Hein et al.

(10) Patent No.: US 8,990,005 B2
(45) Date of Patent: Mar. 24, 2015

(54) SYSTEM AND METHOD FOR PROVIDING GEOREFERENCED PREDICTIVE INFORMATION TO MOTOR VEHICLES

(75) Inventors: Robert Hein, Blonhofen (DE); Andreas Winckler, Mountain View, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 972 days.

(21) Appl. No.: 13/092,473

(22) Filed: Apr. 22, 2011

(65) Prior Publication Data

US 2012/0271544 A1  Oct. 25, 2012

(51) Int. Cl.
*G01C 21/00* (2006.01)
*G01C 21/34* (2006.01)
*G01C 21/36* (2006.01)
G08G 1/0968 (2006.01)
G01C 21/30 (2006.01)

(52) U.S. Cl.
CPC ...... *G01C 21/3407* (2013.01); *G08G 1/096827* (2013.01); *G01C 21/30* (2013.01); *G08G 1/096872* (2013.01); *G01C 21/3415* (2013.01); *G01C 21/3461* (2013.01); *G01C 21/3617* (2013.01); *G01C 21/3679* (2013.01); *G01C 21/3691* (2013.01)
USPC ............ 701/400; 701/411; 701/413; 701/416

(58) Field of Classification Search
CPC .... G01C 21/26; G01C 21/3446; G01C 21/32; G01C 21/36; G01C 21/3415; G01C 21/3461; G01C 21/30; G08G 1/096827
USPC ............ 701/411, 20, 301, 414, 13, 540, 117, 701/423, 3; 340/903, 995.19, 995.13; 370/328; 315/154; 709/203; 705/7.26, 705/7.25
See application file for complete search history.

(56) References Cited

U.S. PATENT DOCUMENTS

| 6,590,507 | B2 |  | 7/2003 | Burns |  |
|---|---|---|---|---|---|
| 7,609,176 | B2 |  | 10/2009 | Yamane et al. |  |
| 8,086,403 | B2 | * | 12/2011 | Ishikawa | 701/423 |
| 8,103,437 | B2 | * | 1/2012 | Nagase et al. | 701/118 |
| 2007/0210936 | A1 |  | 9/2007 | Nicholson |  |
| 2011/0210865 | A1 | * | 9/2011 | Lee et al. | 340/903 |
| 2012/0166076 | A1 | * | 6/2012 | Hardy | 701/414 |
| 2013/0297199 | A1 | * | 11/2013 | Kapp et al. | 701/411 |

* cited by examiner

*Primary Examiner* — Behrang Badii
(74) *Attorney, Agent, or Firm* — Crowell & Moring LLP

(57) ABSTRACT

Georeferenced predictive information is provided by a backend server system to vehicles. Such provided predictive information may be specifically relevant to a provided planned or estimated route of the particular vehicle, and may be used by the vehicle to reconstruct a digital map specific to such planned or estimated route.

20 Claims, 2 Drawing Sheets

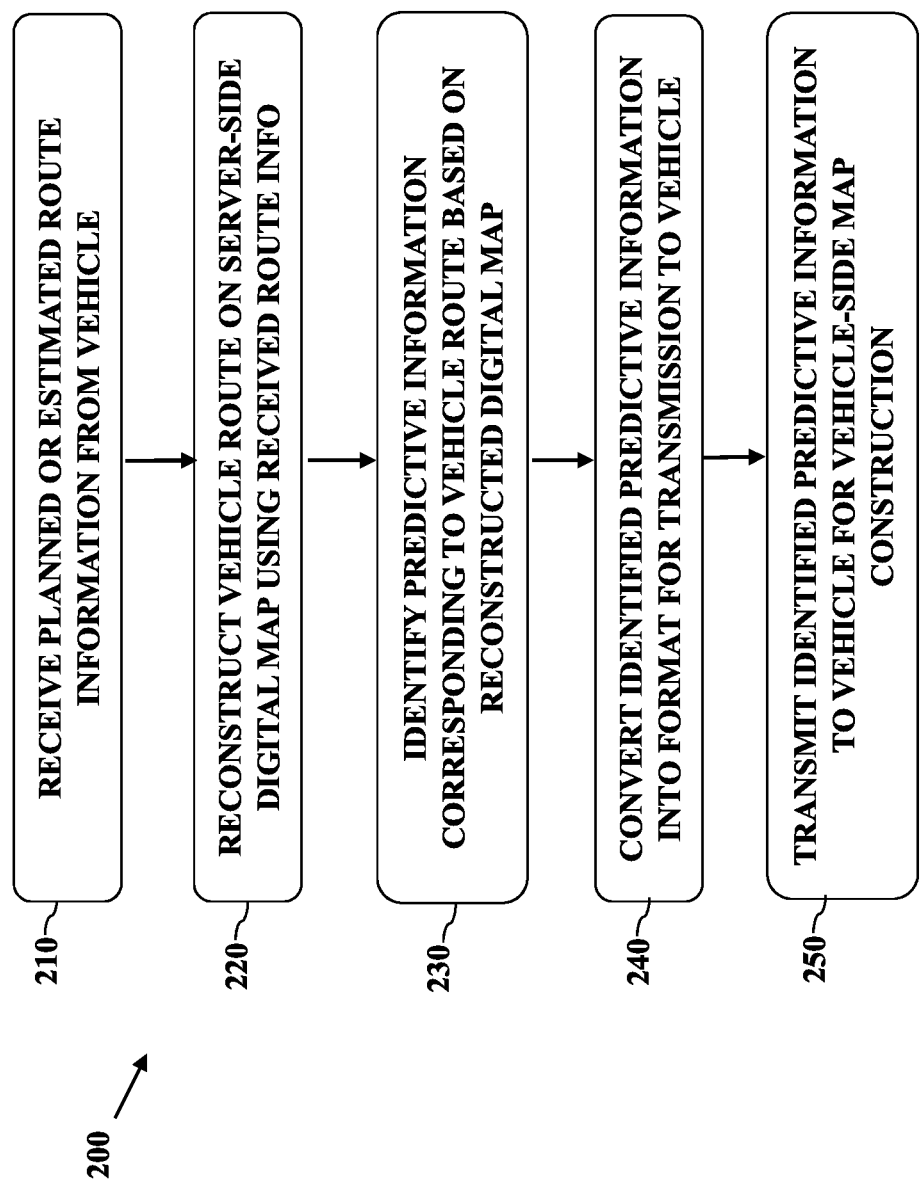

SYSTEM AND METHOD FOR PROVIDING GEOREFERENCED PREDICTIVE INFORMATION TO MOTOR VEHICLES

FIELD OF THE INVENTION

The present invention relates generally to providing georeferenced predictive information, and more particularly to providing georeferenced predictive information to a motor vehicle using an improved and more efficient method.

BACKGROUND OF THE INVENTION

The term "georeferenced" or "location-referenced" information is generally used to describe information that is defined or characterized in some fashion by a physical location to which the information relates. For example, georeferenced information may be information that has been associated with a particular physical location in terms of a map projection or coordinate system.

In the context of motor vehicle navigation systems, georeferenced information is of course used extensively to provide the driver with information regarding street/road topologies, points of interest, naturally occurring physical structures, etc. Moreover, the use of predictive information has been used in motor vehicles in the context of adaptive cruise control (ACC) systems mainly in the form of information concerning road or street types situated ahead for the speed control.

Other forms of predictive information have been used to update map information in a vehicle's navigation system, for example. Such information may include traffic conditions, weather conditions, etc. However, when distributing such merged map information by way of a backend system across a fleet of vehicles over a wireless communication system, a large communication bandwidth is required. This is undesirable because it leads to high transmission costs. Furthermore, it is inevitable that at least some of the transmitted information will have no relevance to a particular vehicle operator because it relates, for example, to a different location.

Therefore, there is a need for providing georeferenced predictive information to a motor vehicle using an improved methodology.

SUMMARY OF THE INVENTION

Disclosed and claimed herein are systems and methods for providing georeferenced predictive information to motor vehicles. In certain embodiments, the method includes receiving, by one or more backend servers from a vehicle over a wireless network, vehicle route information corresponding to a vehicle route, and then reconstructing the vehicle route on a server-side digital using the vehicle route information. The method may further include identifying, by the one or more backend servers, predictive information that is relevant to the vehicle route, wherein the predictive information is georeferenced to a particular location or area. The one or more backend servers may then convert the identified predictive information into a format corresponding to the vehicle, and then transmit, over the wireless network, the identified and converted predictive information to the vehicle, where the transmitted predictive information is configured to be used by the vehicle to constructing the vehicle route on a vehicle-side digital map.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2 depicts one embodiment of a process for carrying out one or more aspects of the invention.

DETAILED DESCRIPTION OF THE EXEMPLARY EMBODIMENTS

Overview

Figure 1:
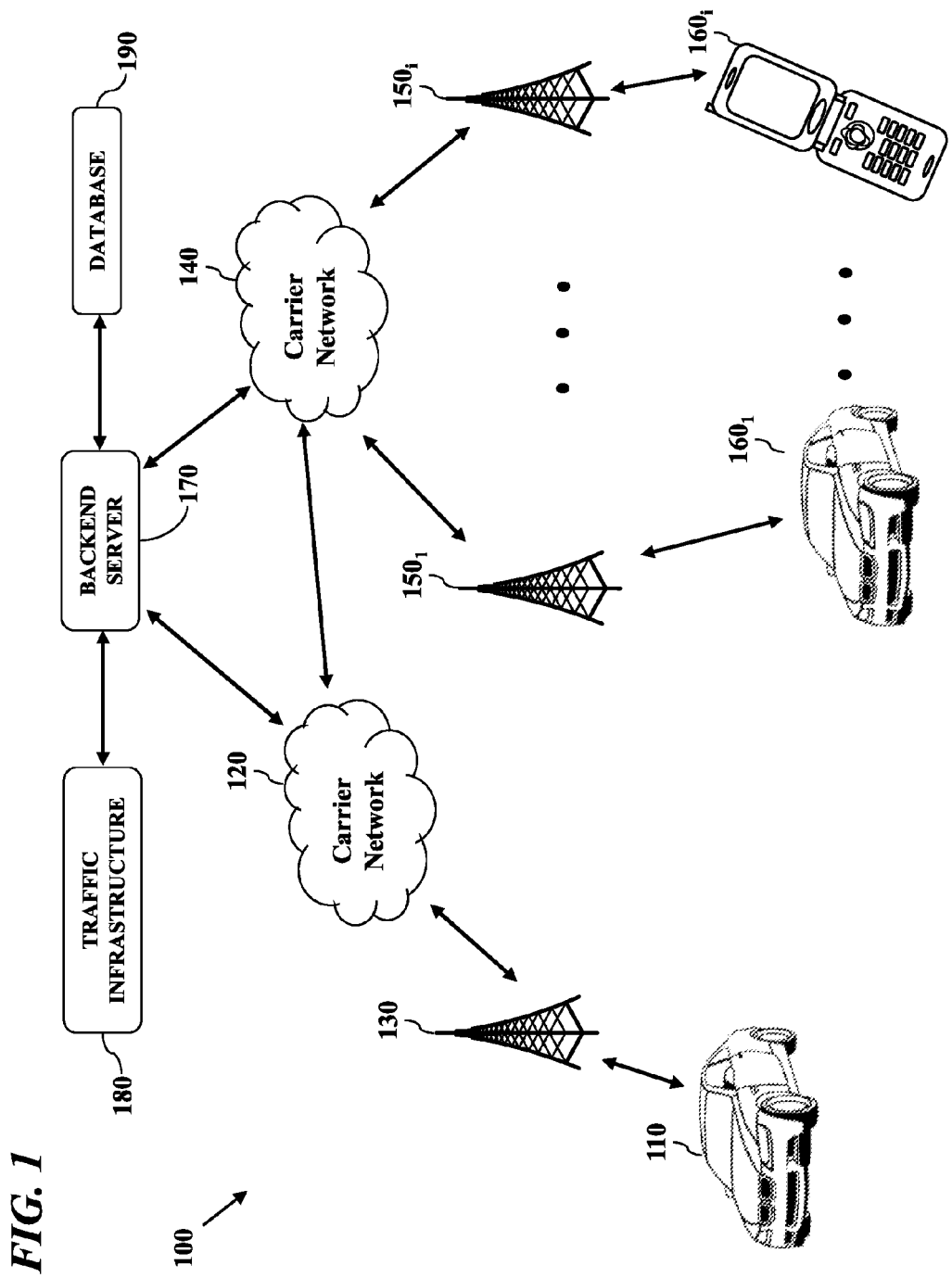
FIG. 1 is a block diagram illustrating an exemplary communication system in which one or more aspects of the invention may be implemented.

One aspect of the invention is to enable individual vehicles to retrieve predictive information from a centralized backend server system. In certain embodiments, the vehicle's route may be determined based on destination information provided by the vehicle's onboard navigation system, or be an estimated or predicted route based on extrapolating from recorded driving habits and history as to what the vehicle's current route is likely to be.

The backend server system may then use the planned or estimated route information provided by the vehicle to reconstruct the vehicle route on a server-side digital map. The server-side digital map may then be populated with any available predictive information which may have been previously provided to and stored by the backend server system. That portion of the available predictive information that is specific or otherwise relevant to the vehicle's particular route may then be readily identified on the server-side digital map, and provided to the vehicle in the manner described in detail below. In this fashion, only predictive information that is relevant to the particular vehicle's route may be provided and used by the vehicle to construct the vehicle route on a vehicle-side digital map specific to the vehicle's planned or estimated route.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

The term "backend server" means a functionally-related group of electrical components, such as a computer system in a networked environment which may include both hardware and software components, or alternatively only the software components that, when executed, carry out certain functions. The "backend server" may be further integrated with a database management system and one or more associated databases.

Exemplary Embodiments

FIG. 1 illustrates a block diagram of a communication system 100 configured to implement one or more aspects of the invention. In one embodiment, the communication system 100 serves various mobile terminals, such as vehicle 110 which communicates with a carrier network 120 via a local base station 130.

Carrier network 120 may be configured to provide a myriad of network layer services, including but certainly not limited to location-based service, messaging service, conferencing service, presence service, etc. In addition, the vehicle 110 may be equipped to provide numerous features and may also include various applications, such as browser applications, chat clients, email clients, Java, personal information management applications, etc.

Continuing to refer to FIG. 1, the communication system 100 will preferably service additional mobile terminal $160_1$-$160_i$ ("160"). In certain embodiments, mobile terminal 160 may be connected to a different carrier network 140 and serviced by separate base stations $150_1$-$150_i$ ("150"). Moreover, as the vehicle 110 moves from having network coverage from carrier network 120 to a different carrier network (e.g., carrier network 140), the available network layer services may similarly change. In addition, it should be appreciated that carrier networks 120 and 140 may be GSM, CDMA, etc., and may be accessible using a variety of access technologies (e.g., IP Multimedia Subsystem).

The communication system 100 further comprises a backend server 170 and traffic infrastructure 180. The backend server 170 is configured to communicate with vehicle 110, as well as other mobile terminals 160, via the carrier networks 120 and/or 140.

It should also be appreciated that the backend server 170 may communicate with the traffic infrastructure 180 using any known communication means, including for example ground-bound lines, wirelessly, etc. Additionally, the backend server 170 may be implemented using a plurality of geographically dispersed servers, or may be implemented in a more centralized architecture. Finally, the traffic infrastructure 180 may comprise any form of known traffic-related infrastructure, including for example, traffic lights, traffic cameras, traffic congestion monitoring systems, and the like.

The backend server 170 is further configured to access database 190, which may be comprised of one or more databases, which may be located locally or remotely from the server 180.

Referring now to FIG. 2, depicted is one embodiment of a process 200 for carrying out one or more aspects of the invention. In particular, process 200 begins at block 210 with a backend server system (e.g., backend server 170) receiving planned or estimated route information from a vehicle (e.g., vehicle 110 or mobile terminal 160). Such route information may be based on destination information (e.g., entered by the driver) provided by the vehicle's onboard navigation system. Such route information may be digital map data organized into nodes (e.g. intersections) and links (e.g. streets) that has attached specific data describing route attributes.

Alternatively, however, such route information may be estimated or predicted based on an intelligent learning navigation system, such as the "ILENA" system developed by the assignee hereof. In any event, such estimated route information may be based on extrapolating from recorded driving habits and history as to what the vehicle's current route is likely to be.

After the backend server system receives the planned or estimated route information at block 210, process 200 may then continue to block 220 where the vehicle route is reconstructed by the backend server system on a server-side digital map using the planned or estimated route information (e.g. nodes, links, attributes).

Once the vehicle route has been reconstructed on a server-side map in a format that is particular to the server-side digital map, the calculation of the predictive information, which is stored in a format that is referenced to the server-side digital map, may begin at block 230. In particular, at block 230 the backend server system may identify/calculate predictive information that is specific or otherwise relevant to the vehicle's particular route, whether it be planned or estimated. In certain embodiments, identifying such predictive information may be carried out by overlaying or populating the reconstructed digital map with georeferenced predictive information that has been previously received and stored by the backend system. In various embodiments, this predictive information may be stored in a centralized database system (e.g., database 190) that is otherwise accessible to the backend server. Moreover, such predictive information may be stored in a location-referenced merged format which is continually or periodically updated as new information is received by the backend server.

It should further be appreciated that such predictive information may comprise "electronic horizon" information. The so-called electronic horizon of the vehicle is needed as to inform or react in advance to events which either are outside of a drivers visual range or whose continuous monitoring would pose an unnecessary burden on the driver. The electronic horizon can be derived from vehicle sensors (radar, laser, etc.), from wirelessly received data and from satellite-based systems (GPS).

Such predictive information can include, for example, traffic conditions, weather conditions, visibility, traffic light phase and timing information, etc., at least some of which may have been received wirelessly from networked traffic infrastructure (e.g., traffic infrastructure 180). In addition, such information may include approaching speed limits, road sections with speed limitations, intersections with no right of way, slope, curvature, street type, number of lanes, various types of hazard information, and other road/street topography information. Generally, however, such information may comprise any information which is relevant improved travel safety and/or efficiency.

Moreover, by virtue of being georeferenced or location-referenced, such predictive information will by definition be associated with a particular physical location or area in terms of a map projection, known coordinate system or the like. Thus, when the cumulated or merged predictive information is overlaid or populated onto the reconstructed digital map, the result will be an identification of all available predictive information which has some effect or relevance to the geographic area being traversed by the vehicle, as part of its planned or estimated route.

Once the relevant predictive information has been identified at block 230, process 200 may then continue to block 240 where such identified relevant predictive information may then be converted into a format suitable for wireless transmission to the vehicle in question. In addition to converting the information into a file format that is suitable for wireless transmission, this conversion process may include converting the predictive information into a format based on the vehicle's capabilities for displaying geographic information including, for example, the type and version of the graphical digital map that is displayed by the vehicle's onboard navigation system. That is, since different vehicles tend to have different digital mapping systems and versions thereof, the georeference characteristics of the predictive information may be used to format the information for the particular vehicle to ensure that it is accurately displayable by the vehicle. Thus, it may be preferable for the vehicle to also send, e.g., along with the planned or estimated route referenced above at block 210, information which is representative of the particular digital mapping system used by the vehicle in question. With such information, the backend server may then be able to provide the predictive information, or electronic horizon information, in a format that is recognized by the vehicle.

Once the identified information has been properly formatted at block 240, process 200 may then continue to block 250 where the identified and formatted predictive information may then be wirelessly transmitted by the backend server to the vehicle so that the vehicle may then construct its own digital map using the provided relevant predictive information that is specific to the planned or estimated route. The transmitted information will be valid as long as the vehicle does not leave the planned/estimated route. If, however, the vehicle does leave the planned/estimated route, process 200 may be repeated. In this fashion, vehicular access is provided to location-specific predictive information on demand and in an efficient manner that substantially reduces the data transmission overhead.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for providing georeferenced predictive information to motor vehicles, the method comprising the acts of:

receiving, by one or more backend servers from a vehicle over a wireless network, vehicle route information corresponding to a vehicle route, wherein the vehicle route information comprises digital map data organized into nodes and links having specific data describing route attributes;

reconstructing the vehicle route on a server-side digital map, by the one or more backend servers, using the vehicle route information received from the vehicle;

populating, by the one or more backend servers, the server-side digital map with predictive information that is relevant to the vehicle route, wherein the predictive information is georeferenced to a particular location or area;

converting, by the one or more backend servers, the predictive information into a format corresponding to the vehicle; and transmitting, by one or more backend servers over the wireless network, the predictive information to the vehicle, wherein the transmitted predictive information is configured to be used by the vehicle in constructing and displaying the vehicle route on a vehicle-side digital map.

2. The method of claim 1, wherein receiving the vehicle route information comprises receiving, by one or more backend servers over the wireless network, a planned vehicle route from a navigational system of the vehicle based on user-defined destination information.

3. The method of claim 1, wherein receiving the vehicle route information comprises receiving, by one or more backend servers over the wireless network, an estimated vehicle route from the vehicle based, at least in part, on driver habit information.

4. The method of claim 1, wherein identifying the predictive information comprises identifying, by the one or more backend servers, a subset of the available predictive information that identifies one or more current conditions affecting at least a portion of the vehicle route.

5. The method of claim 1, further comprising receiving, by one or more backend servers over the wireless network, information from the vehicle corresponding to a version of the vehicle-side digital map.

6. The method of claim 5, wherein converting the identified predictive information comprises converting, by the one or more backend servers, the identified predictive information into the format corresponding to the vehicle based on said version of the vehicle-side digital map.

7. The method of claim 1, wherein the predictive information comprises information corresponding to one or more of traffic conditions, weather conditions, traffic light phase and timing information and approaching speed limits.

8. A system for providing georeferenced predictive information to motor vehicles, the system comprising:

a backend server system coupled to a wireless connection and configured to:

receive, from a vehicle, vehicle route information corresponding to a vehicle route, wherein the vehicle route information comprises digital map data organized into nodes and links having specific data describing route attributes, reconstruct the vehicle route on a server-side digital map using the vehicle route information received from the vehicle, populate the server-side digital map with predictive information that is relevant to the vehicle route, wherein the predictive information is georeferenced to a particular location or area, convert the predictive information into a format corresponding to the vehicle, and transmit, over the wireless network, the predictive information to the vehicle, wherein the transmitted predictive information is configured to be used by the vehicle in constructing and displaying the vehicle route on a vehicle-side digital map.

9. The system of claim 8, wherein the vehicle route information is a planned vehicle route, and wherein the backend server system is further configured to receive the planned vehicle route, over the wireless network, from a navigational system of the vehicle based on user-defined destination information.

10. The system of claim 8, wherein the vehicle route information is an estimated vehicle route based, at least in part, on driver habit information.

11. The system of claim 8, wherein the backend server system is further configured to identify the predictive information by identifying a subset of the available predictive information that identifies one or more current conditions affecting at least a portion of the vehicle route.

12. The system of claim 8, wherein the backend server system is further configured to receive, over the wireless network, information from the vehicle corresponding to a version of the vehicle-side digital map.

13. The system of claim 12, wherein the backend server system is configured to convert the identified predictive information by converting the identified predictive information into the format corresponding to the vehicle based on said version of the vehicle-side digital map.

14. The system of claim 8, wherein the predictive information comprises information corresponding to one or more of traffic conditions, weather conditions, traffic light phase and timing information and approaching speed limits.

15. A computer program product comprising:

a processor storage medium having computer executable program code embodied therein to provide georeferenced predictive information to motor vehicles, the processor storage medium having:

computer executable program code to reconstruct a vehicle route on a server-side digital map based on vehicle route information that was provided by a vehicle, wherein the vehicle route information comprises digital map data organized into nodes and links having specific data describing route attributes, computer executable program code to populate the server-side digital map with predictive information that is relevant to the vehicle route, wherein the predictive information is georeferenced to a particular location or area, computer executable program code to convert the predictive information into a format corresponding to the vehicle, and computer executable program code to provide the predictive information to the vehicle, wherein the transmitted predictive is configured to be used by the vehicle in constructing and displaying the vehicle route on a vehicle-side digital map.

16. The computer program product of claim 15, wherein the vehicle route information comprises a planned vehicle route provided by a navigational system of the vehicle based on user-defined destination information.

17. The computer program product of claim 15, wherein the vehicle route information comprises an estimated vehicle route based, at least in part, on driver habit information.

18. The computer program product of claim 15, wherein the computer executable program code to identify the predictive information comprises computer executable program code to identify a subset of the available predictive information that identifies one or more current conditions affecting at least a portion of the vehicle route.

19. The computer program product of claim 15, wherein the computer executable program code to convert the identified predictive information comprises computer executable program code to convert the identified predictive information into the format corresponding to the vehicle based on a version of the vehicle-side digital map provided by the vehicle.

20. The computer program product of claim 15, wherein the predictive information comprises information corresponding to one or more of traffic conditions, weather conditions, traffic light phase and timing information and approaching speed limits.

\* \* \* \* \*